Sept. 28, 1926.  H. C. HARRIS  1,601,172
VEHICLE SPRING
Filed March 2, 1922
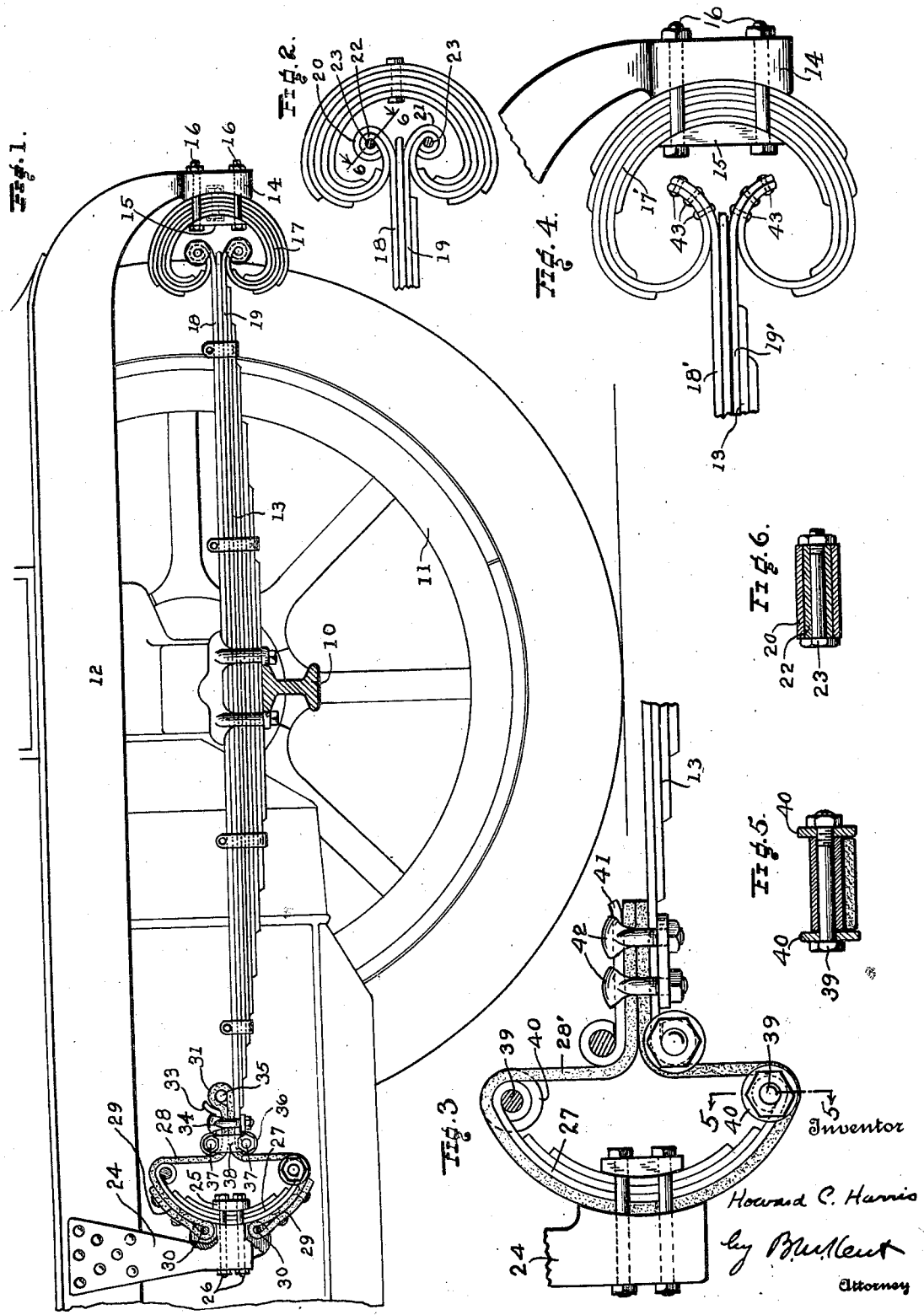
Inventor
Howard C. Harris
by B. M. Kent
Attorney Patented Sept. 28, 1926.

1,601,172

UNITED STATES PATENT OFFICE.

HOWARD C. HARRIS, OF AKRON, OHIO.

VEHICLE SPRING.

Application filed March 2, 1922. Serial No. 540,505.

This invention relates to vehicle springs and has reference more particularly to improved means for connecting the ends of a multiple-leaf spring with the vehicle frame so as to cushion fore and aft shocks and also provide a more flexible mounting that will, to a certain extent, act as a shock absorber. A further object of the invention is to eliminate the ordinary spring shackles and provide means for attaching the ends of the spring to the frame in such manner that rattling of the parts will be eliminated.

A further object of the invention is to provide a comparatively simple and inexpensive substitute for the ordinary spring shackle which will do away with the noise that is produced by the present types of construction and will also act as a cushion between the spring and the frame and thereby enhance the riding qualities of the vehicle.

Other objects and the features of novelty will be apparent from the following description taken in connection with the accompanying drawings, of which—

Figure 1 is a side elevation of a spring embodying my invention and shown in its relation to the front axle and frame of a vehicle;

Fig. 2 is an enlarged fragment of Fig. 1;

Fig. 3 is an enlarged fragment of Fig. 1, but illustrating a modification of the connection between the rear end of the spring and the frame;

Fig. 4 is a side elevation of a modified form of connection between the forward end of the spring and the frame;

Fig. 5 is a section on the line 5—5 of Fig. 3; and

Fig. 6 is a section on the line 6—6 of Fig. 2.

Referring to the drawings 10 represents the front axle of a motor vehicle and 11 one of the wheels. The frame of the vehicle is indicated at 12 and at 13 I have shown a multiple-leaf spring for mounting the frame on the axle, this spring being mainly of the ordinary construction, but differing therefrom in the construction of its ends.

From Fig. 1, it will be noted that there is secured to the horn 14 of the frame, by means of a pressure plate 15 and bolts 16, a multiple-leaf scrolled spring 17, of the type commonly known as a C-shaped spring. The plates 18 and 19, of the spring 13, are provided at their forward end with oppositely turned eyes 20 and 21, respectively, which are intercoiled with the eyes 22 of the C-shaped spring 17. These intercoiled eyes are close-fitting so as to avoid the possibility of noise therefrom, and are secured against relative lateral displacement by bolts 23.

From the foregoing description it will be evident that the spring 17 acts as a flexible bracket and, on account of the ordinary bolt for connecting the eye of the spring with the frame and because of the close-fitting of the intercoiled eyes, will provide a connection between the spring 13 and the frame which is not only capable of absorbing the fore and aft shocks, due to road conditions, but also has a limited amount of verticle flexibility and will eliminate wear and noise at this point.

In connecting the rear end of the spring 13 with the frame I provide a bracket 24 on the frame and mount on this bracket, by means of the pressure plate 25 and the bolts 26, a curved spring 27, preferably of semi-elliptic form, and connect this spring with the rear end of the spring 13 by means of a flexible strap 28 which may be made of heavy belting fabric or leather, or any other equivalent material suitable for the purpose. The ends of the strap 28 are preferably formed with the loops 29 to receive the pins 30 by which they are connected with the bracket 24. The ends of the strap 28 are laid on the exterior of the spring 27 and the middle portion of the strap is formed with a loop 31 which is laid on the main leaf of the spring 13 and secured thereto by means of a plate 33 and a U-shaped clip 34. A plug 35 may be arranged in the loop 31 and by using various sizes of these plugs all slack or stretch in the strap 28 may be taken up.

The spring 13 is provided with an eye 36 and the plate 33 is likewise provided with an eye and these eyes receive the bolts 37, which carry the side plates 38 for preventing relative lateral displacement of the loop 31 and the spring 13. The spring 27 is provided with eyes 31 at its ends and bolts 39 in these eyes and washers 40 on the bolts prevent relative lateral displacement of the strap 28 and the spring 27.

The construction just described eliminates the usual shackle for connecting the rear end of the spring with the frame and provides a flexible mounting for the end of the spring which is adapted to accommodate lengthening and shortening of the spring due to deflections thereof. When the vehicle is in use the spring 27 flexes under the influence of road shocks and thus the form of mounting which I have devised acts as a shock absorber.

In Fig. 3 I have illustrated a slight modification of the method of connecting the strap with the spring and the bracket 24 and in this the ends of the strap 28' are laid on the spring 13 and clamped thereto by means of the plate 41 and the clips 42. In this form the middle portion of the strap 28' is secured between the bracket 24 and the spring 27.

In the form of the invention illustrated in Fig. 4 the spring 17' has ends without eyes rigidly connected with the plates 18' and 19' of the spring 31 by rivets 43, or in any other equivalent manner.

From Fig. 1 it will be apparent that the form of the spring mounting which I have devised provides ample flexibility at both ends of the spring 13 to cushion road shocks and also take care of any lengthening and shortening due to deflections. The elimination of the usual spring bolts and shackles from both ends of the spring 13 provides a construction which will do away with the noise that accompanies the use of the ordinary forms of connection and, notwithstanding the advantages possessed by my means, they may be utilized at very little additional cost over that of the present construction.

Having thus described my invention, what I claim is:

1. In vehicles, the combination of an axle, a frame, a multiple-leaf spring having a plurality of eyes at one end, a scrolled-leaf spring secured intermediate its ends to said frame and having eyes with which said eyes of the multiple-leaf spring are interengaged, and means connecting the other end of said multiple-leaf spring with the frame.

2. In vehicles, the combination of an axle, a frame, a multiple-leaf spring having a plurality of eyes at one end, a scrolled-leaf spring secured intermediate its ends to said frame and having eyes with which said eyes of the multiple-leaf spring are interengaged, and means connecting the other end of said multiple-leaf spring with said frame adapted to accommodate the lengthening and shortening of the spring due to deflections thereof.

3. In vehicles, the combination of an axle, a frame, a multiple-leaf spring having a plurality of oppositely turned eyes at one end, a C-shaped spring secured intermediate its ends to said frame and having eyes intercoiled with said eyes of the multiple-leaf spring, and means connecting the other end of said multiple-leaf spring with the frame.

In testimony whereof I affix my signature.

HOWARD C. HARRIS.